United States Patent [19]

Faulkner et al.

[11] 3,997,307
[45] Dec. 14, 1976

[54] METHOD AND APPARATUS FOR MAKING GLASS FIBERS UTILIZING AN OSCILLATING SPINNER

[75] Inventors: Duane Harold Faulkner, Cambridge City; Steven Douglas Sanford; Herbert Meredith Stanley, both of Richmond, all of Ind.

[73] Assignee: Johns-Manville Corporation, Denver, Colo.

[22] Filed: July 28, 1975

[21] Appl. No.: 599,614

[52] U.S. Cl. .......................................... 65/6; 65/8; 65/14; 65/15; 264/8; 425/381.2
[51] Int. Cl.² ................................. C03B 37/04
[58] Field of Search ............... 65/6, 8, 14, 15, 9; 264/8; 425/381, 381.2

[56] References Cited

UNITED STATES PATENTS

| 3,134,145 | 5/1964 | Miller | 65/9 X |
| 3,265,483 | 8/1966 | Garrison et al. | 65/6 X |
| 3,295,943 | 1/1967 | Mabru | 65/8 X |
| 3,374,075 | 3/1968 | Maddox et al. | 65/6 |
| 3,546,898 | 12/1970 | Langlois et al. | 65/9 X |

*Primary Examiner*—Robert L. Lindsay, Jr.
*Attorney, Agent, or Firm*—Robert M. Krone; Joseph J. Kelly; John H. Miller

[57] ABSTRACT

Attempts have been made by the prior art to oscillate a veil of air entrained centrifugally spun fibers back and forth across a moving collecting surface to build a layer of fibers having uniform thickness and density. The present invention accomplishes this objective by oscillating a fiberizing rotor, preferably about an axis that runs through the bottom wall of the spinner.

23 Claims, 5 Drawing Figures

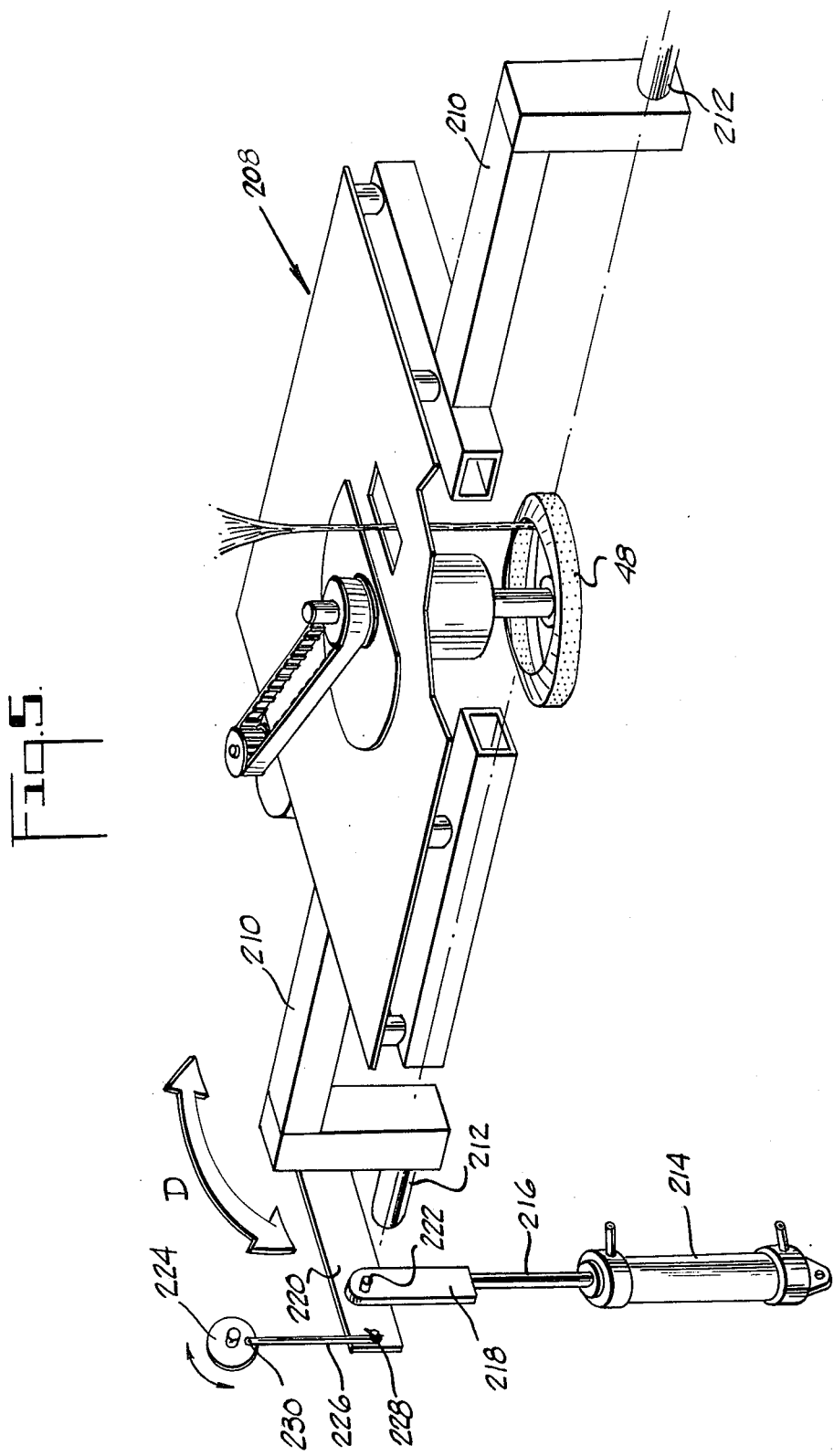

METHOD AND APPARATUS FOR MAKING GLASS FIBERS UTILIZING AN OSCILLATING SPINNER

The present invention relates to a method and apparatus for spinning fibers from a molten material and for directing the spun fibers back and forth across a collecting surface that is usually moving with respect to the spinning apparatus.

BACKGROUND OF THE INVENTION

It is well known in the art to form fibers from molten materials, e.g., inorganics such as glass, slag, refractory compositions, etc., by centrifugally spinning as evidenced by U.S. Pat. Nos. 3,326,650, 3,187,194, and 3,801,243. When such processes are used to form continuous mats or blankets of non-woven fibers, a collection problem exists. The width of the mat or blanket desired is usually much wider than the veil or column of air entrained fibers created by the centrifugal spinning. In addition to merely spreading the veil of fibers to cover the entire width of the moving collection belt, it must be done in such a manner that the layer of fibers collected is relatively uniform in thickness and density. Although many techniques have been proposed to accomplish this objective, most either fall short or present other problems or requirements that are undesirable.

One attempt to disburse the spun fibers evenly over the collection surface involves placing a plurality of fiberizing spinners in a single collection chamber, either in line or staggered, and creating sufficient turbulence within the chamber to produce a uniform cloud of fibers directed towards the collection belt. While this technique produces a mat of acceptable uniformity of thickness and density, many of the fibers in the collected mat are oriented along the thickness dimension of the mat which is detrimental to the thermal insulating potential of a fibrous mat.

Other proposals have involved oscillating a veil or column of gas entrained spun fibers back and forth in a plane running transverse to the direction of movement of the collecting surface. Early proposals involved causing the column to oscillate by manipulating a plurality of gas jets mounted in the side walls of the collection chamber, as evidenced by U.S. Pat. Nos. 2,863,493 and 3,030,659. The disadvantages of this technique are outlined in U.S. Pat. No. 3,134,145 (column 1, lines 65–72 and column 2, lines 1–15).

Another technique is described in U.S. Pat. Nos. 3,134,145, 3,546,898, 3,625,667, and 3,877,911. This technique involves suspending an elongated hollow member below the spinner so that the veil of spun fibers is directed into one end of the hollow member. The member is then oscillated back and forth around an axis running through the top portion of the member which deflects the column or veil of fibers and directs the veil to different portions of the collection surface. Such a system prevents adding binder to the fibers until after the fibers exit the oscillating hollow member. If binder is added prior to entering the oscillating member, the tackiness imparted to the fibers by the binder would cause a buildup of fibers and binder on the interior of the hollow member and would necessitate frequently interrupting the operation to clean out the hollow member.

SUMMARY OF THE INVENTION

It has now been discovered that a veil or column of spun fibers can be moved back and forth across a collecting surface, without the necessity of using the directing gaseous jets or pivoting hollow member of the prior art, by moving the rotor or spinner in such a manner as to direct the veil of fibers over the desired area. The spinner could be moved or oscillated laterally while the axis of rotation remains in a vertical position, but it is more advantageous to oscillate the spinner about an axis that intersects the rotational axis of the rotating spinner such that the rotational axis above the bottom wall of the rotor pivots about a point that preferably lies within the bottom wall of the spinner or within 6 inches of the bottom wall.

While conventional fiberizing spinners can be used in the present invention, a spinner requiring no hot, high velocity, gaseous blast to attenuate the fibers is most advantageously used.

The present invention also includes apparatus for accomplishing the above result.

BRIEF DESCRIPTION OF THE DRAWINGS

FIG. 5 is a partial perspective view of another embodiment of the present invention, broken away partially to better show the fiberizing spinner.

DETAILED DESCRIPTION AND PREFERRED EMBODIMENTS

Figure 1:
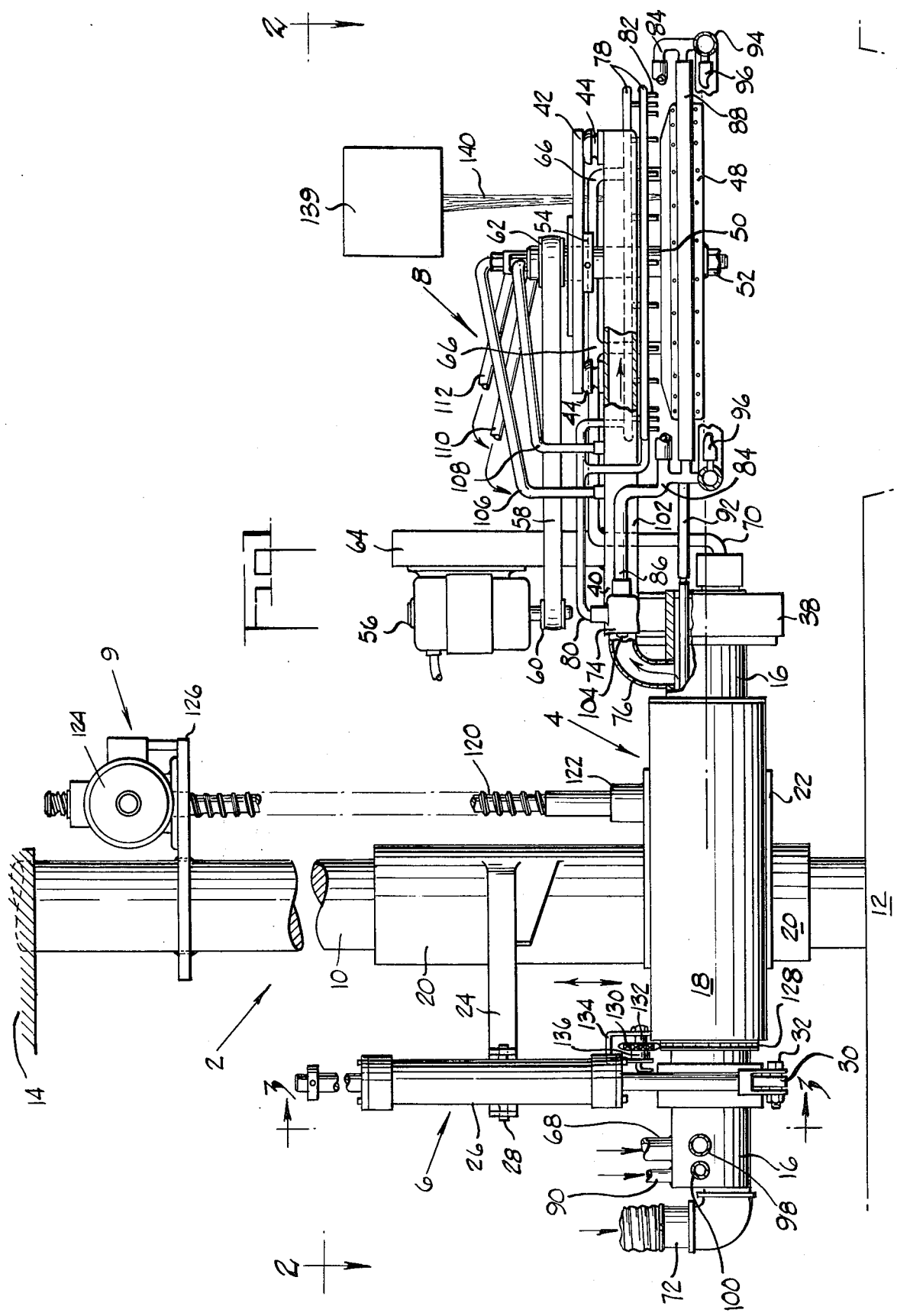
FIG. 1 is a broken side elevational view of a preferred embodiment of the present invention with certain areas cut away to better illustrate the apparatus.
Figure 2:
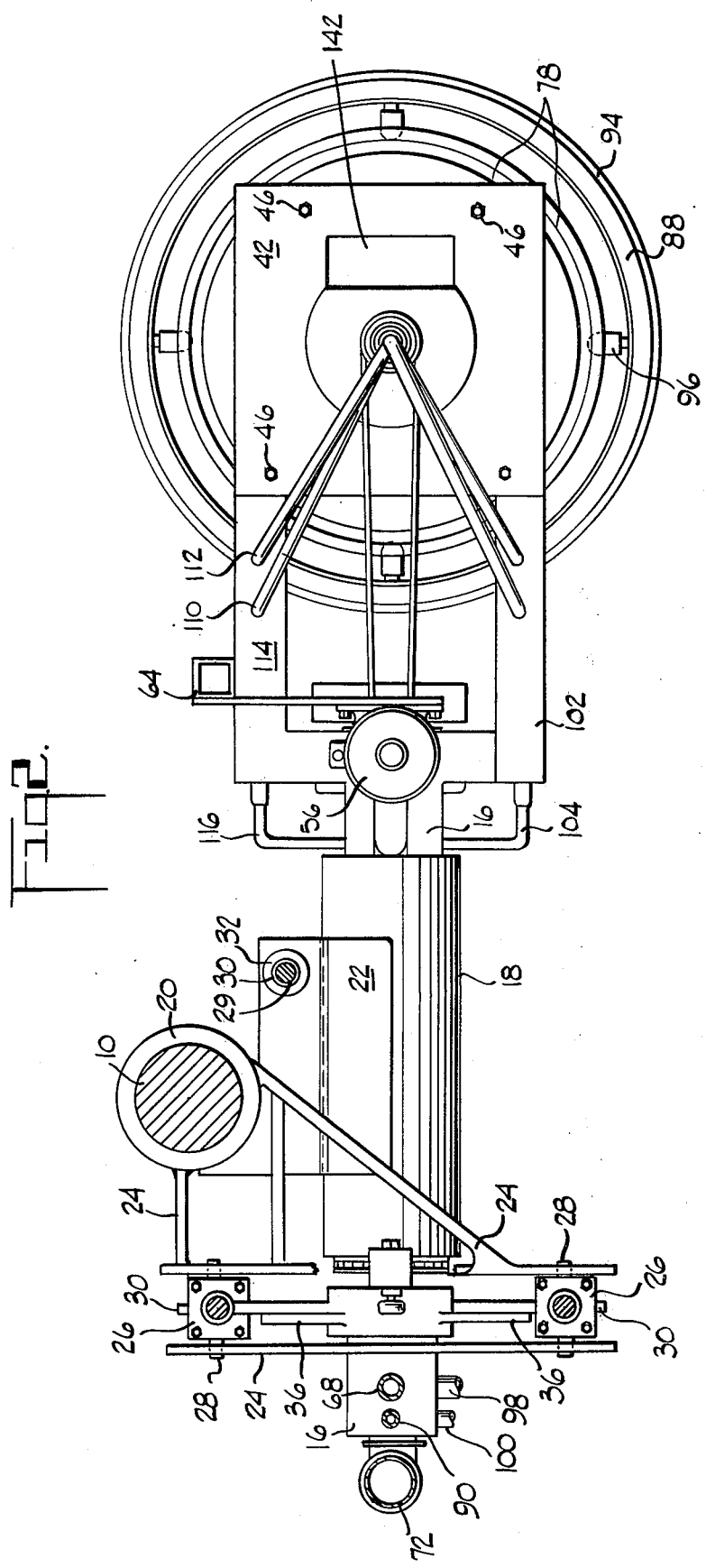
FIG. 2 is a plan view of the apparatus as shown in FIG. 1, looking along lines 2—2.
Figure 3:
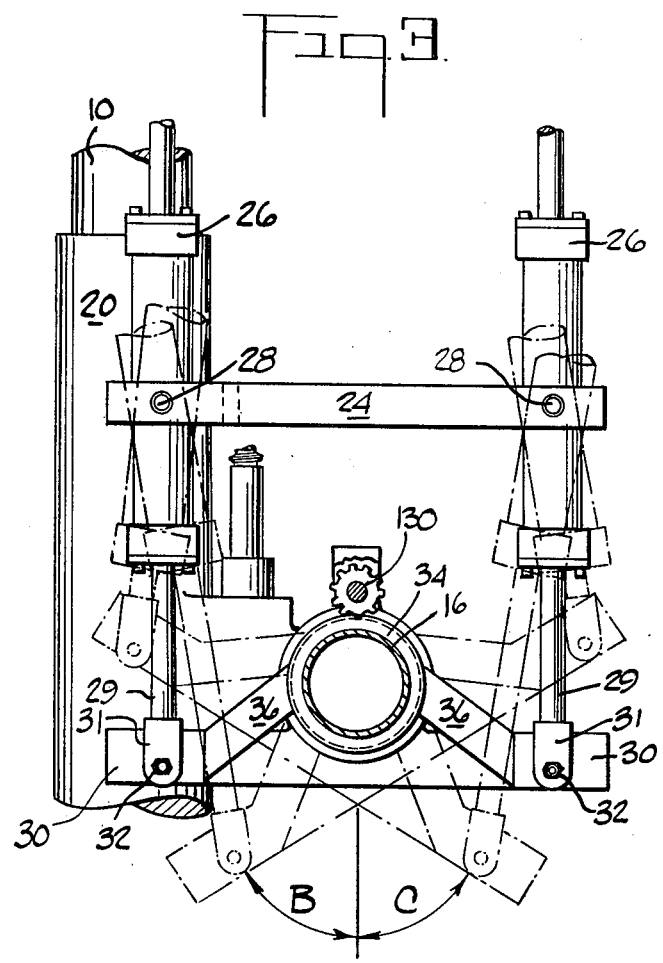
FIG. 3 is a broken partial end view of the apparatus shown in FIG. 1, looking along lines 3—3, and shows an oscillating drive mechanism in various positions during a cycle of oscillation.

A preferred embodiment of the present invention is illustrated in FIGS. 1–3. Referring to FIG. 1 the apparatus comprises a vertical support assembly 2, a horizontal support and services assembly 4, a vertical positioning assembly 9, an oscillating mechanism 6, and a centrifugal fiberizing or spinner assembly 8. The vertical support assembly 2 comprises a rotatable vertical support and guide member 10 which is connected to a lower bearing support structure 12 and an upper bearing support structure 14, both of which can be conventional bearing assemblies fastened to a steel supporting structure of a building. A sleeve 20 is slidably mounted on the vertical support member 10 using appropriate conventional bearings or bushings to permit sleeve 20 to slide along a guide slot (not shown) running along the length of the support 10. A saddle member 22 is attached to the sleeve 20 for holding the horizontal support and service member 4.

The horizontal support and service member 4 comprises a hollow cylindrical inner member 16 and a hollow outer sleeve 18. The sleeve 18 is rigidly attached to the saddle 22 and conventional bearings and bushings (not shown) are conventionally mounted between the sleeve 18 and the inner member 16 to permit the inner member 16 to rotate with respect to the sleeve 18. In addition to supporting the spinner assembly 8, inner member 16 acts as a conduit for the various services such as air, combustion mixture, water, and binder solution required by the spinner assembly 8. These services will be described in more detail later in the description.

Inner member 16 is caused to rotate clockwise and counter clockwise through a desired angle by the oscillating mechanism 6. In the embodiment shown, the oscillating mechanism is supported by an arm assembly 24 attached to the vertical sleeve 20. To the arm assembly 24 are pivotally attached to hydraulic cylinders 26 by pins 28. Although the apparatus illustrated uses two hydraulic cylinders, the machine would operate with one hydraulic cylinder or any suitable mechanism for providing the rotation and counter rotation function. Also, while the fluid cylinders shown are double rod end type cylinders, either single acting or double acting single rod end cylinders could be used.

The rod 29 of each of the cylinders 26 is attached to a yoke 30 by a clevis 31 and a pin 32. The yoke 30 is rigidly attached to the hollow inner member 16 by a collar 34. Arms 36 provide additional support between the yoke 30 and the collar 34. The oscillating mechanism is best shown in FIG. 3.

To the other end of the hollow inner member 16 is attached the spinner assembly 8 by way of a collar 38 rigidly attached to the inner member 16 and by a hollow U-shaped frame member 40 which is rigidly attached to the collar 38. A metal plate 42 spans the frame 40 and rests on conventional vibration dampers 44. The plate 42 is bolted to the frame 40 by bolts 46.

Although any conventional spinner assembly can be used in the apparatus of the present invention, it is preferred to use a spinner assembly requiring no external hot gas blast attenuation, such as that illustrated in FIG. 1. A rotor 48, preferably a one piece cast metal rotor, is attached to a rotatable shaft 50 by the nuts 52 in a conventional manner. The rotor 48 preferably has at least about 30,000 laser drilled orifices, each having a diameter of about 9 to 13 mils in its outer wall. The rotatable shaft 50 is mounted in conventional fluid cooled bearings 54 attached to the metal plate 42. The shaft 50 and rotor 48 are rotated by an electric motor 56 and a conventional belt drive 58 spanning a motor pulley 60 and a shaft pulley 62. The motor 56 is held in place by a metal frame 64 which is attached to one leg of the frame 40.

Although the services such as air, water, gas, and binder solution needed by the spinner assembly could be brought in through flexible lines running to manifolds around the spinner assembly, in the embodiment illustrated in FIGS. 1–3 these services are brought in through the hollow inner member 16. This is advantageous for two reasons. There are no draping lines around the spinner assembly and the service lines produce a minimum effect in the oscillation by being close to the axis of oscillation. A mixture of combustible fuel and air is fed to a plurality of burners 66, located to disperse flame within the interior of rotor 48 to keep the molten material at the proper temperature for spinning, by a line which enters member 16 through an inlet 68 and exits member 16 as line 70. A relatively low pressure compressed air is fed into line 72 which line runs through the interior of hollow member 16 and joins a manifold 74, formed by the cross member of frame 40, by way of an elbow 76. The manifold 74 provides compressed air to the stripper rings 78 via outlet 80. Conventional pressure regulators (not shown) placed in line 80 provide a desired pressure in the stripper rings 78 of typically about 15 psig. The air exits the stripper ring 78 through a plurality of nozzles 82 for the purpose of breaking up the spun fibers into staple fibers of desired length.

When it is desired to add a binder to the spun fibers, the manifold 74 also provides compressed air to line 84 via line 86 for atomizing a binder solution which is fed to a binder manifold 88 via inlet 98 and line 92. Air passing from line 84 into manifold 94 picks up binder solution from the binder manifold 88, atomizes the binder solution, and delivers a binder spray onto the spun fibers by way of a plurality of conventional nozzles 96 spaced around the manifold 94.

The rotor shaft 50 and the bearings 54 are water cooled to prevent overheating due to the high temperature in the area of the rotor 48. Water for the cooling is supplied by a line 90 that runs through the hollow member 16 and exits into a manifold 102, which is part of the frame 40, via line 104. Lines 106 and 108 coming off of the manifold 102 feed cooling water to the rotor shaft and bearings in a conventional manner (see FIG. 2). After the cooling water has passed through the rotor shaft 50 and the bearings 54 it exits through lines 110 and 112 which are connected to a manifold 114, which also is part of the frame 40. This waste water exits the manifold 114 via line 116 which runs through the hollow member 16 and exits at outlet 100.

An optional feature on the preferred embodiment is the vertical adjusting mechanism 9. This mechanism comprises a threaded shaft 120 which is rigidly fixed to a sleeve 122 which in turn in welded to the saddle member 22. The threaded shaft 120 runs through a conventional jack mechanism 124. such as a Duff-Norton jack. This jack is mounted on plate 126 which in turn is welded or otherwise rigidly attached to the vertical support 10. The jack 124 is reversible and when actuated in one direction pulls the shaft 120 vertically upward which in turn pulls the spinner mechanism 8 vertically upward and when reversed lowers the shaft 120 and the spinner mechanism 8. The sleeve 20 moves vertically along the vertical support 10 as indicated by arrows A. The feature allowing the spinner mechanism 8 to be raised or lowered is not necessary, but is sometimes useful to provide more convenient access to the spinner assembly 8 for maintenance purposes. Any equivalent mechanism for hoisting or lowering an object could be used in place of the jack and threaded shaft means illustrated.

The oscillating mechanism 6 has previously been described. A suitable mechanism for monitoring the position of the spinner and for controlling the speed of oscillation and the degree of tilting of the rotor 48 is also illustrated in FIGS. 1–3. This mechanism comprises a chain 128 secured around the outer surface of the inner member 16. This chain is similar in construction to a bicycle chain, but is larger and of more rugged construction. Mounted to ride in this chain is a toothed gear 130 which is rotatably supported by pin 132 in a frame member 134. Rigidly attached to one base of the gear 130 is one component of a small conventional potentiometer 136. The other component of the potentiometer (not shown) is rigidly attached to the frame 134 such that when the gear 130 rotates one part of the potentiometer rotates with the gear while the other part of the potentiometer remains fixed. The potentiometer 136 sends out a signal whose polarity is dependent on the direction in which the gear 130 is rotating, and the magnitude of which is dependent upon the amount gear 130 has rotated from a fixed neutral point. The fixed neutral point usually is where the axis of rotation of the rotor is in a vertical position.

By monitoring the signal produced by the potentiometer 136 the position of the rotor 48 can be detected continuously throughout the oscillating cycle. This output signal from the potentiometer can also be used in conjunction with other conventional control and valving equipment to operate the oscillating mechanism 6. With this control the angle, as represented by arrows B and C (FIG. 3) can be varied and controlled, and also the rate at which the rotor, or its axis of rotation, is changed from one position to another and the speed at which the pivoting movement of the rotor is reversed at the end of the stroke can be controlled and varied. For example, it is sometimes advantageous to increase the rate at which the rotor is pivoted in the end portion of one stroke and the beginning of the reverse stroke to compensate for a slight delay caused by the valving action required to stop the movement in one direction and to start the rotor pivoting back in the opposite direction. This slight delay can otherwise cause the edges of a collected mat of fibers to be thicker than the center portion, but this can be eliminated by speeding up the speed of oscillation at the appropriate point to compensate for the delay in the reversing mechanism.

Figure 4:
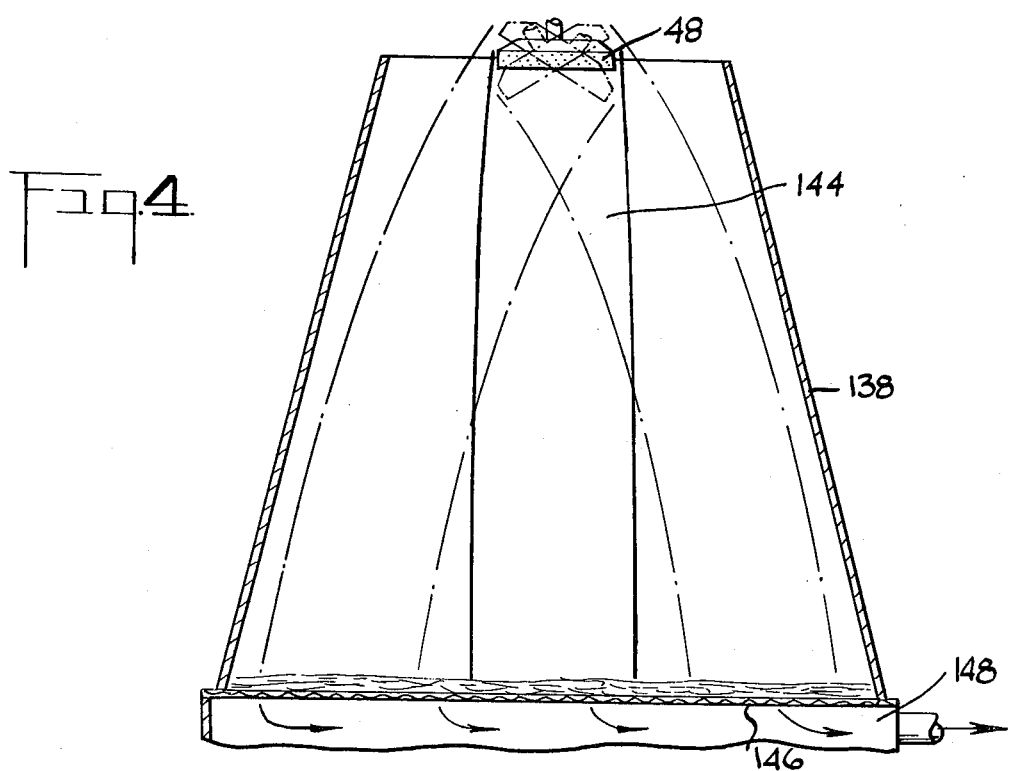
FIG. 4 is a partial cross-section through a collection chamber showing an oscillating spinner and the veil path when the spinner is in various positions.

In operation the apparatus shown in FIGS. 1–3 is positioned so that the rotor 48 is positioned above a collecting chamber 138, as shown in FIG. 4. Fiberizing is begun by rotating the rotor 48 at 2000 to 3000 RPM and by feeding a material such as molten glass from a feeding means 139, such as a forehearth of a glass tank, an electric furnace, a refining tank, etc., into the rotor 48 in the form of a stream 140 through a rectangular slot 142 in the plate 42. Compressed air, at about 15 psig, is fed to the stripper ring 78 and out through the nozzles 82 at a nozzle pressure of about 5 psig. An air/fuel mixture is fed to the burners 66 which maintain the interior temperature of the rotor 48 within a proper range for fiberization. The centrifugal force caused by the rapidly rotating rotor 48 causes the molten glass to pass through the tiny orifices in the outer wall of the rotor forming fibers of about 5 microns or less in diameter. The relatively low velocity air streams coming from the nozzles 82 cools the spun fibers and causes them to break off into staple fibers of the desired length.

The combination of the spinning rotor 48 and the air streams coming from the nozzles 82 produces a veil or column of fibers 144 (FIG. 4). When the rotor 48 is maintained in a fixed position the veil of fibers 144 will not cover the complete width of a collection surface 146 at the bottom of a collection chamber 138. But, when the rotor is oscillated in the manner shown in FIG. 3 and by the phantom lines in FIG. 4, the veil of fibers 144 is swept back and forth across the desired width of the collection surface 146 to form a layer of fibers having a uniform thickness and density. In making an 8 foot wide mat using the apparatus illustrated in FIGS. 1–3 the speed of oscillation is typically in the range of about 0.2 cycles per second to about 1 cycle per second, preferably about 0.5 cycles per second. Looking at FIG. 4, a cycle of oscillation is defined by the rotor being moved from its starting position such that the column of fibers sweeps to one edge of the collection surface, moves back across the width of the collection surface to the opposite edge, and then moves back in the opposite direction to its starting position. The actual speed of oscillation will depend upon the rate of formation of the fibers by the rotating spinner and the rate of movement of the collecting surface. The faster the collecting surface is moving, the greater must be the oscillation rate to provide a mat having uniform thickness.

Fibers are collected on the collection surface 146 by using a permeable collection surface, usually a moving wire mesh belt, and by drawing gases through the openings in the collection surface and through a suction box 148 located below the collection surface using a large suction fan (not shown) in a conventional manner.

Moving the veil of fibers 144 around over the collection surface 146 by moving the spinner or rotor 48, or its rotational axis, provides many advantages over the techniques used in the prior art described earlier. One of these advantages is that the binder can be put on the fibers closer to the location where the fibers are formed and therefore while the fibers are in the most open or dispersed condition. Further, by moving the rotor, the entire column or veil of fibers are moved instead of having to interrupt the flow of the veil of fibers and redirect the veil in a different direction. For this reason the same effect can be achieved with the present invention as achieved with the prior art technique, but in significantly less vertical space between the rotor 48 and the collecting surface 146.

While it is preferred to use a spinner assembly with the present invention that requires no exterior hot blast of gases to attenuate the fibers, a conventional spinner assembly using external hot blast attenuation can be used with the present invention. When using such spinner assemblies, and when adding binder to the fibers in the area immediately below the rotor, the higher temperatures of hot blast attenuated fibers causes the binder to partially precure making the fibers very tacky. For this reason when using these techniques it is advisable to control the rotor movement such that the veil of fibers does not contact the walls of the collection chamber to avoid buildup on the collection chamber walls.

When moving the spinner, or its rotational axis, in the manner shown in FIG. 3 it is advantageous for the axis about which the rotor pivots or oscillates to run through the bottom wall of the spinner or rotor. While this is not essential, it is desired because such oscillation provides the least disruption or effect on the flow of molten glass inside the rotor.

It is also possible to achieve the desired results by moving the rotor 48, or its rotational axis, in a different manner than shown in FIG. 3. For example, the bottom wall of the rotor 48 may be held in a fixed horizontal position while the rotor is moved laterally, such as by swinging the rotor through an arc by rotating and counter rotating the vertical support 10 a desired amount to cause the veil of fibers 144 to cover the desired width of the collection surface 146. Also, the spinner assembly could be mounted on a traversing mechanism that could be traversed back and forth across a distance corresponding to the desired width of the collection belt above the collection chamber using conventional traversing mechanisms. The method of moving the rotor 48 shown in FIG. 4 is preferred because it requires less energy and produces little or no effect on the flow patterns of the molten material inside the rotor 48.

Whereas the apparatus disclosed in FIGS. 1–3 utilizes a cantilever support for the spinner assembly 8, the apparatus illustrated in FIG. 5 provides supports on both sides of the spinner mechanism. In this embodiment a spinner mechanism 208 which can be the same or different than the spinner mechanism illustrated in FIG. 1, is suspended in a yoke 210 which pivots around rods 212 rigidly attached to the yoke 210. Conventional bearing supports are provided for supporting the pins or rods 212 in a rotationable manner. Oscillation of the rotor 48 is provided by a fluid activated cylinder 214 having a rod 216 attached to a clevis 218 which in turn is pivotally attached to an arm 220 by a pin 222. The arm 220 is rigidly attached to the yoke 210. Cycling of the cylinder causes the yoke 210 to rotate about the axis of rods 212 in the directions indicated by arrows D. Again, it is preferred that the spinner assembly be mounted on the yoke 210 in such a manner that the rotational axis of the rods 212 passes through or near the bottom wall of the rotor 48 and intersects the axis about which the rotor rotates to spin fibers.

The position of the arm 220, and thus the position of the bottom wall of the rotor 48, is monitored and the operation of the cylinders 214 is controlled in a similar manner to that used in the preferred embodiment. One member of a potentiometer 224 is connected through a linkage arm 226 to the arm 220 by pins 228 and 230 such that when the arm 220 moves upwardly or downwardly, one component of the potentiometer 224 rotates with respect to the other component thus sending out a signal indicative of the position of arm 220. Other known mechanisms that could be used for monitoring the position of the bottom wall of the rotor or the axis of rotation of the rotor, and for controlling the oscillating mechanisms in the desired manner are readily available and could be used in place of the monitoring and controlling mechanisms described here.

Operation of the spinner assembly 8 shown in FIGS. 1–3 is described in more detail in U.S. patent application Ser. No. 544,097, filed Jan. 27, 1975, which disclosure is incorporated herein by reference. The advantages of using such a spinner assembly and technique of forming fibers, particularly glass fibers, with the present invention are many. There is much less turbulence in the veil produced by such a spinner assembly and technique and the binder coated fibers are not so tacky that they tend to stick to any surface they come in contact with. For these reasons, buildup of fiber and binder on the collection chamber walls is not a problem.

In describing the invention certain embodiments have been used to illustrate the invention and the practice thereof. However, the invention is not limited to these specific embodiments as other embodiments and modifications within the spirit of the invention will readily occur to those skilled in the art on reading this specification. The invention is thus not intended to be limited to the specific embodiments disclosed, but instead is to be limited only by the claims appended hereto.

What we claim is:

1. In a method of making a fibrous mat comprising feeding a molten material to a rotor, rotating the rotor at a high speed to form fibers, stripping the fibers from the exterior of the rotor to form a column of loose fibers, and moving said column back and forth across the width of a collection surface, the width of said collection surface being substantially greater than the width of said column of loose fibers; the improvement comprising: moving said column of fibers by moving the rotor such that the rotor's axis of rotation is moved such that said column of fibers is swept back and forth to form said fibrous mat across the width of said collection surface.

2. A method as defined in claim 1 wherein the rotor's axis is oscillated back and forth in a single plane.

3. A method as defined in claim 2 wherein said axis is moved by being pivoted about a line that is within six inches from the bottom wall of the rotor.

4. A method as defined in claim 3 wherein the pivot point lies within the bottom wall of the rotor.

5. A method as defined in claim 3 wherein the rotor has a peripheral wall containing a plurality of openings and the fibers are formed by molten material passing through the openings due to centrifugal force created by the spinning rotor.

6. A method as defined in claim 5 wherein the formed fibers are stripped from around the rotor by moving gases, the temperature of these gases being insufficient to promote attenuation of the fibers.

7. A method as defined in claim 6 wherein the collection surface is moving in a direction transverse to the plane in which the rotor's axis is being moved.

8. A method as defined in claim 7 wherein the pivot point for the rotor's axis lies on a surface of, or within, the bottom wall of the rotor.

9. A method as defined in claim 2 wherein the rate at which said axis is moved is changed during at least one portion of a cycle of oscillation.

10. A method as defined in claim 9 wherein the rate is increased near the extremities of the movement of the axis to compensate for any delay in stopping the movement of the axis in one direction and in starting the axis moving back in an opposite direction.

11. A method as defined in claim 8 wherein the rate at which said axis is moved is changed during at least one portion of a cycle of oscillation.

12. A method as defined in claim 11 wherein the rate is increased near an extremity of the movement of the axis to compensate for any delay in stopping the movement of the axis in one direction and in starting the axis moving back in an opposite direction.

13. A method as defined in claim 2 wherein the axis is moved along a curved path about a point spaced from said path.

14. A method as defined in claim 8 wherein said axis is oscillated at a rate of at least about 0.2 cycles per second.

15. A method as defined in claim 8 wherein said molten material is inorganic.

16. A method as defined in claim 15 wherein said molten material is a glass composition.

17. A method as defined in claim 3 wherein said molten material is a glass composition.

18. In an apparatus for forming fibers by centrifical force comprising a rotor means for forming a column of the fibers, said rotor having a bottom wall, means for feeding molten material to said rotor, means for rotating the rotor means about an axis of rotation, means for supporting said rotor, and means for collecting said fibers in mat form, said collecting means being substantially wider than said column of fibers; the improvement comprising: means for moving said rotational axis while said rotor is rotating such that said axis pivots about a line located within about 6 inches from the bottom wall of said rotor and such that said column of fibers is swept back and forth across the width of said collection means.

19. An apparatus as defined in claim 18 wherein means for moving said rotational axis is capable of oscillating said axis back and forth such that the movement of said axis above said bottom wall defines a V-shaped configuration.

20. An apparatus as defined in claim 19, the improvement further comprising:
means for monitoring the position of said axis, and
means cooperating with said monitoring means and said moving means for changing the direction of movement of said rotational axis.

21. An apparatus as defined in claim 20, the improvement further comprising:
means cooperating with said moving means for changing the rate of movement of said rotational axis.

22. An apparatus for forming a layer of centrifugally formed fibers comprising:

a. a fiberizing means comprising a rotor and means for rapidly rotating said rotor about a rotational axis, b. means for feeding molten material to said rotor, c. a horizontal support for supporting said fiberizing means, said horizontal support being rotatable about a horizontal axis, said horizontal axis being in a plane that also lies in a bottom wall of said rotor, and d. oscillating means for causing said horizontal support to rotate and counter rotate in an oscillating manner whereby the rotational axis of said rotor pivots about a point lying within the bottom wall of said rotor.

23. An apparatus as defined in claim 22 wherein said horizontal support is a hollow tube, and a plurality of pipes pass through the hollow interior of said tube for providing services to said fiberizing means.

* * * * *